United States Patent [19]
Ono et al.

[11] Patent Number: 5,450,387
[45] Date of Patent: Sep. 12, 1995

[54] OPTICAL PICKUP APPARATUS FOR PHASE CHANGING OPTICAL DISK

[75] Inventors: Masumi Ono; Atsushi Fukumoto, both of Kanagawa; Kouichi Yasuda, Tokyo, all of Japan

[73] Assignee: Sony Corporation, Tokyo, Japan

[21] Appl. No.: 957,600

[22] Filed: Oct. 6, 1992

[30] Foreign Application Priority Data

Oct. 7, 1991 [JP] Japan ................................. 3-259437

[51] Int. Cl.$^6$ .............................................. G11B 7/095
[52] U.S. Cl. .................................. 369/44.26; 369/44.37
[58] Field of Search ............... 369/44.26, 44.29, 44.32, 369/44.35, 44.36, 44.41, 44.37–44.38; 235/454, 487, 494

[56] References Cited

U.S. PATENT DOCUMENTS 3,876,842  4/1975  Bouwhuis .
5,070,490  12/1991  Endo ............................ 235/487 X

FOREIGN PATENT DOCUMENTS

0324949A1  7/1989  European Pat. Off. .
0426879A1  5/1991  European Pat. Off. .
3-292632  12/1991  Japan .
5-089511  4/1993  Japan .

OTHER PUBLICATIONS

Patent Abstracts of Japan, vol. 16, No. 131, (P1332), Dec. 24, 1991, & JP3-292632.
Patent Abstracts of Japan, vol. 11, No. 354, (P638), Jun. 15, 1987 & JP62-132246.

Primary Examiner—W. R. Young
Attorney, Agent, or Firm—Limbach & Limbach

[57] ABSTRACT

An optical disk reproducing apparatus for optical disks which are have a material layer whose reflectivity is lowered when a temperature of this material exceeds a predetermined temperature, is fabricated on a transparent substrate. A plurality of phase pits have been formed in this substrate corresponding to an information signal. The optical disk reproducing apparatus comprises: an optical pickup for reading the information signal by irradiating on a recording plane of the optical disk, a first optical spot for reproducing the information signal, and also second and third optical spots each having lower light intensity than that of the first optical spot. The second and third optical spots located at positions where there is no adverse influence caused by a thermal history of the first optical spot. The optical disk reproducing apparatus further comprises tracking control unit for performing a tracking control of the optical pickup based upon a difference signal between detection signals derived from first and second photo detecting units of the optical pickup, for receiving light of the second and third optical spots reflected from the optical disk.

8 Claims, 5 Drawing Sheets

OPTICAL PICKUP APPARATUS FOR PHASE CHANGING OPTICAL DISK

BACKGROUND OF THE INVENTION

1. Field of the Invention

The present invention relates to an optical pickup apparatus for writing an information signal to an information signal recording medium such as a magneto-optical disk.

2. Description of the Prior Art

Conventionally, information signal recording mediums capable of writing an information signal therein by an optical means have been proposed. For instance, a magneto-optical disk functioning as such an information signal recording medium is constructed of a disk substrate and a signal recording layer coated on this disk substrate. The signal recording layer is manufactured by such a vertical magnetic recording material that a direction of magnetization can be reversed by heating the signal recording layer at a temperature higher than a so-called "Curie temperature" by irradiating a laser beam and applying an external magnetic field to this recording layer. To write and read the information signal into and from such an information signal recording medium, an optical pickup apparatus has been utilized.

The optical pickup apparatus is mainly arranged by, as shown in FIG. 3, a laser diode 12 functioning as a light source, and an objective lens 17 for collecting a light beam emitted from the laser diode 12 on the signal recording layer.

In such an optical disk, the reading light is irradiated to the disk plane, and the signal is read (reproduced) by detecting a great decrease in a reflection light amount caused by diffraction of the laser beam at the phase-pit forming portions of the disk.

In the above-described optical disk, resolving power of a signal reproduction is substantially determined by a wavelength "λ" of light from a light source in a reproduction optical system and also a numerical aperture NA of the objective lens. A spatial frequency of 2NA/λ becomes a reproduction limit value of an optical disk.

As a consequence, to achieve high density information storage such an optical disk, a wavelength "λ" of light from a light source (for instance, a semiconductor laser) for a reproducing optical system must be shortened, or the numerical aperture NA of the objective lens must be increased.

However, there is an inherent limitation on shortening the wavelength "λ" of the light from the light source and on increasing the numerical aperture NA of the objective lens. These inherent limitations make it difficult to drastically increase the recording density of the recording medium.

Thus, the Applicant has proposed an optical disk capable of achieving the resolving power higher than the above-explained limitation defined by the wavelength "λ" and the numerical aperture NA by utilizing reflectivity by the partial phase variation within the scanning spot of the reading light (refer to Japanese laid-open patent applications No. 2-94452, and No. 3-249511).

FIG. 1 is a sectional view of one example of such an optical disk. This optical disk shown in FIG. 1 is formed in such a manner that a phase changing material layer 3 which can be crystallized after being melted, is fabricated on a transparent substrate 2. There are phase pits, such as phase pit 1, on the transparent substrate corresponding to an information signal.

In this case, when the read light, for instance, the reproducing laser light is irradiated to the material layer 3, a temperature distribution occurs in the scanning spot of the read light. As a result, the material layer 3 is partially brought from the crystal state to the melting state, so that reflectivity is lowered. This material layer returns to its normal crystal state the information has been read out from the optical disk.

Referring now to FIG. 2, a description will be made of such a case that the reproducing laser light is irradiated to the optical disk shown in FIG. 1.

In FIG. 2A, symbol "SP" denotes a laser spot which is scanned along an arrow direction "SC" in conjunction with the rotation of the optical disk. Although the respective phase pits 1 are arranged at the minimum recording period "q" as shown in FIG. 2B, this arrangement interval and the pit length may be, of course, changed in accordance with the recording data.

Also, in FIG. 2B, an abscissa represents a position related to the scanning direction SC of the laser spot SP. When the laser spot SP is irradiated onto the optical disk (see FIG. 2A), the light intensity of the laser spot SP has a distribution indicated by the dotted curve "a." In contrast thereto, the temperature distribution at the material layer 3 of the optical disk as indicated by the solid curve "b" is slightly behind along the scanning direction SC of the laser spot SP, as compared with the light intensity distribution "a." The separation between the curves depends upon the scanning speed of the laser spot SP.

Assuming now that, as described above, the laser spot SP is scanned along the scanning direction SC as shown in FIG. 2A, the temperature of the optical disk is gradually increased from the leading edge of the laser spot SP along the scanning direction, and finally becomes higher than the melting point MP of the material layer 3.

At this stage, the state of the material layer 3 is transferred from the crystal state of the initial stage to the melting state, so that the reflectivity thereof is lowered. As a result, there are simultaneously a region "Px" (indicated by a hatched line of FIG. 2A) from which the phase pit 2 cannot be read due to the lower reflectivity thereof, and also a region "Pz" from which the phase pit 1 can be read due to its higher reflectivity, within the laser spot SP.

Therefore, as illustrated in FIG. 2A, even when, for example, two phase spots 1 are present within the same laser spot SP, the information reading operation is carried out with respect only to a single phase spot 1 existing in the region Pz having higher reflectivity. As a consequence, the information reading operation can be done at ultra high resolving power without any restriction caused by the wavelength "λ" of the read light and the numerical aperture of the objective lens. Thus, a high density recording operation can be achieved.

It should be noted that the reflectivity of the phase changing material layer 3 is lower in the melting state of the above-described optical disk (FAD type optical disk), than in the crystal state. However, an optical disk may be manufactured by properly selecting various conditions of the phase changing material, e.g., a structure and a thickness in such a manner that the reflectivity of the phase changing material layer 3 is higher under the melting state, than in the crystal state. In such an optical disk, only the phase pit within the region (see the hatched portion of FIG. 2A) whose reflectivity is increased due to the melting state thereof, can be read out. To avoid confusion, an optical disk in which reflectivity of a phase changing material layer thereof under a crystal state is higher than that under a melting state will be referred to as an FAD type optical disk, whereas an optical disk in which reflectivity of a phase changing material layer thereof under a melting state is higher than that under a crystal state will be referred to as an RAD type optical disk. Accordingly, the information reading operation with ultra high resolving power can be effected for this RAD type optical disk in a similar manner to the FAD type optical disk, so that a high density recording operation can be achieved.

When an information signal is reproduced from such an optical disk that the material layer 3 is formed on the transparent substrate 2 in which the above-described phase pit 1 is formed, the push-pull method has been employed as the tracking servo system. The push-pull method is described in, for example, U.S. Pat. Nos. 3,909,608 and 4,961,183.

However, in case of an FAD type optical disk and also a RAD type optical disk, as previously explained, the information reproduction with ultra high resolving power is carried out by irradiating the laser spot SP on the track of the optical disk to be read, and by changing the reflectivity of the partial region Px within the laser spot SP due to the variations in the temperature distributions caused in the laser spot (see FIG. 2).

In this case, the shape of the region Px formed by the variations in the temperature distributions occurring in the laser spot, the reflectivity of which is changed, is not always symmetrical with respect to the centerline of a track. As a result, when the tracking servo operation is performed by the push-pull method, the tracking error signal cannot be obtained under a stable condition, and also a stable tracking control cannot be executed.

SUMMARY OF THE INVENTION

To solve the above-described conventional problems, the present invention has been made, and has an object to provide such an optical disk reproducing apparatus capable of performing a stable tracking control when the above-mentioned FAD type optical disk and RAD type optical disk, especially FAD type optical disk, is reproduced.

To achieve the above object, an optical disk reproducing apparatus is provided, according to the present invention, for reproducing an optical disk in which a material layer whose reflectivity decrease at temperatures exceeding a predetermined value, has been formed on a transparent phase pits corresponding to an information signal are present at the interface between the material layer and the substrate. This optical disk reproducing apparatus includes an optical pickup which produces a first optical spot to reproduce the signal, and also second and third optical spots each having lower light intensity than that of the first optical spot on a recording plane of the optical disk. The reproducing apparatus further includes a tracking servo means for controlling tracking of the optical pickup by means of a three-beam method based on reflection light derived from the second and third optical spots. These second and third optical spots irradiate disk locations positions where no influence of heat history caused by the first optical spot is present.

In above-described the optical disk reproducing apparatus, the light intensity of the second and third optical spots is lower than that of the first optical spot, and the positions of the second and third optical spots are set to the position where no influence of the heat history caused by the first optical spot is present. Also, the reflectivity is not changed due to the variations in the temperature within the second and third optical spots. As a consequence, when the tracking servo control of the optical pickup is performed by way the three-beam method based upon the reflection light derived from the second and third optical spots, the tracking error signal can be obtained in a stable condition and also the stable tracking control can be achieved.

BRIEF DESCRIPTION OF THE DRAWINGS

For a better understanding of the present invention, reference is made of the following descriptions in conjunction with the accompanying drawings, in which.

DETAILED DESCRIPTION OF THE PREFERRED EMBODIMENTS

Figure 3:
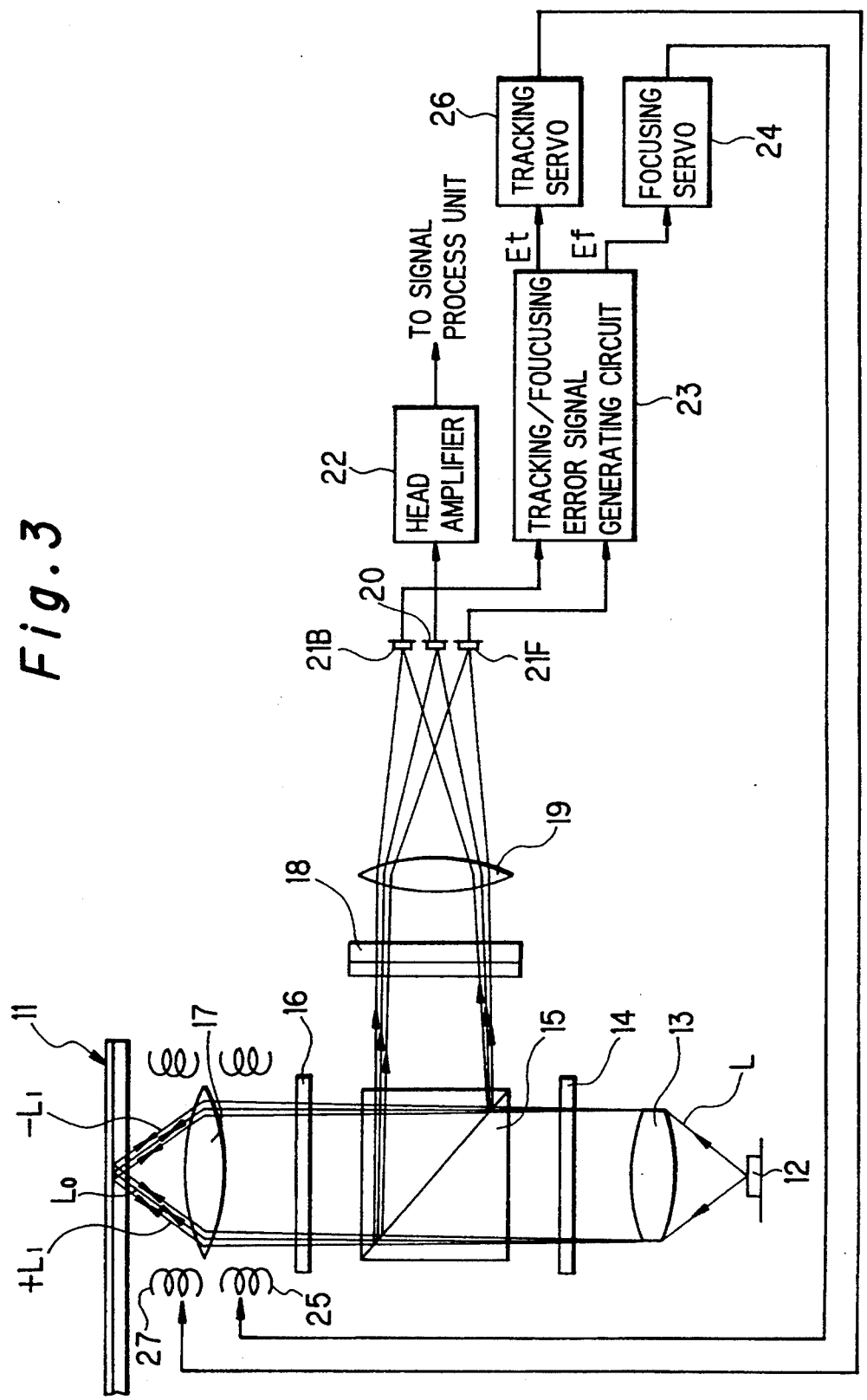
FIG. 3 is a schematic diagram for showing an overall arrangement of an optical disk reproducing apparatus according to a preferred embodiment of the present invention.
Figure 4:
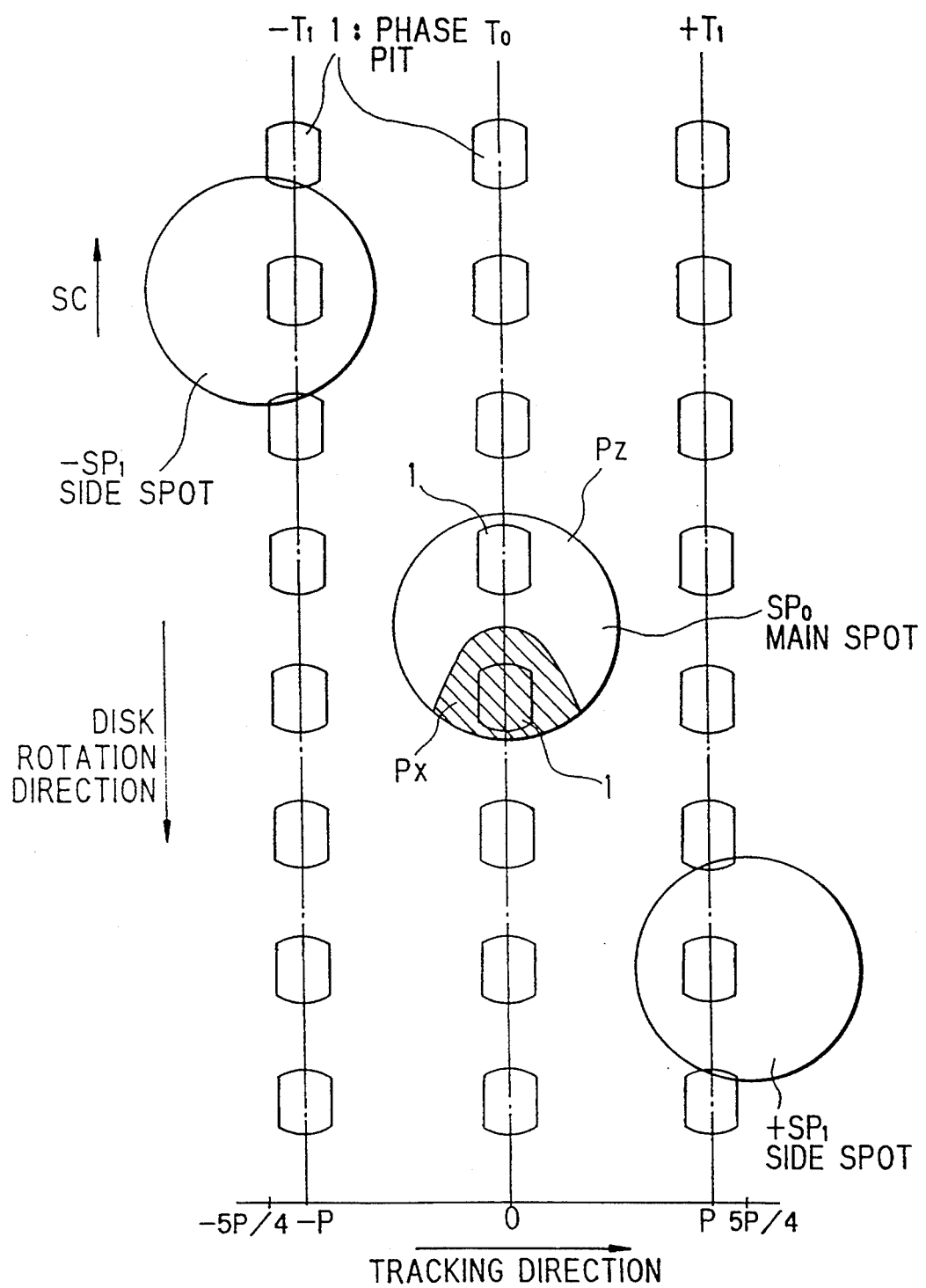
FIG. 4 schematically represents laser spots formed on the recording plane of the optical disk.

Referring now to FIGS. 3 and 4, an optical disk reproducing apparatus according to a preferred embodiment of the present invention will be described.

In this drawing, reference numeral 11 denotes an optical disk which corresponds to the above-described FAD type optical disk. Reference numeral 12 shows a semiconductor laser. Light "L" emitted from this semiconductor laser 12 is irradiated via a collimating lens 13, a diffraction grating 14, a polarizing beam splitter (simply referred to a "PBS") 15, a ¼-wavelength plate 16, and an objective lens 17 onto a recording plane in which a phase pit of the optical disk 11 has been formed.

Figures 2A, 2B:
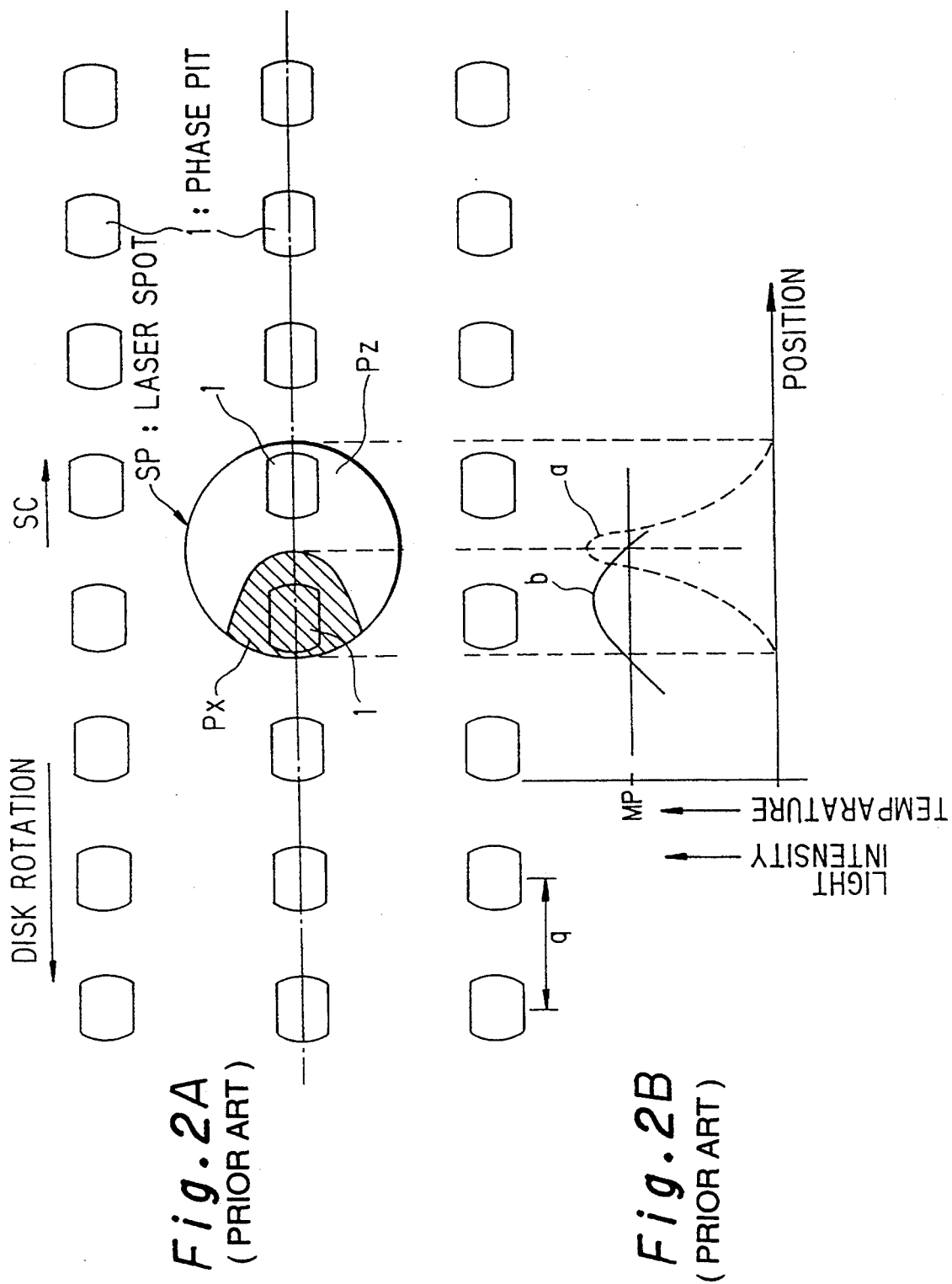
FIGS. 2A and 2B schematically represent a relationship between a light intensity distribution of a laser spot and a temperature distribution (reflectivity) of the optical disk.

Since the laser light "L" is diffracted by the diffraction grating 14, laser spots by zero-order diffraction light "L0", first-order diffraction light ±L1, second-order diffraction light ±L2 (not shown), . . . , are formed in the recording plane of the optical disk 11. In this case, the laser spot (main spot) by the zero-order diffraction light L0 is formed on a track T0 to be read. Laser spots (side spots) by the first-order diffraction light ±L1 are formed on positions which are separated in the tracking direction from the track T0 by ±5P/4 (symbol "P" indicates a track pitch). The tracking direction is the radial direction of the optical disc which is perpendicular to the scanning direction SC). Placement of the side spots can be changed by adjusting the grating width and the rotation angle of the diffraction grating 14 (shown in FIG. 4). In FIG. 4, the same reference numerals are employed as those for denoting the same, or similar components shown in FIG. 2. It should be noted that symbol ±T1 indicates a track positioned adjacent to the track T0.

The power of the semiconductor laser 12 determined the light intensity of the main spot SPO and the side spots ±SP1. The light intensity of the spots should be set so that, the main spot SPO has such a light intensity that reflectivity of a partial region within the main spot SPO is changed by variations in the temperature distribution, which are caused by scanning the main spot SPO on the track, whereby the reproduction with the ultra high resolving power can be performed. On the other hand, the side spots ±SP1 should be of a light intensity such that reflectivity no portions within the side spots ±SP1 are changed by the variations in the temperature distribution.

The light reflected from the spots SPO and ±SP1 formed in the recording plane of the optical disk 11 is incident upon the PBS 15 through the objective lens 17 and the ¼-wavelength plate 16. Since the reflection light incident upon the PBS 15 passes through the ¼-wavelength plate 16, this light has its linear polarization rotated by 90° from the first linear polarization (laser light L). The reflected light is again reflected at the PBS 15.

The reflection light from the spots SPO and ±SP1, which is reflected at the PBS 15, is incident upon photodetectors 20, 21F and 21B via cylindrical lens 18 and a condenser lens 19, respectively, and then is photoelectrically converted therein. The photodetector 20 has a single optical sensor. An output signal from this photodetector 20 is amplified by a head amplifier 22, and thereafter the amplified signal is supplied to a signal processing system (not shown), so that an information signal is outputted.

The photodetector 21B has a single photosensor. The photodetector 21F is a so-called "4-splitted detector" constructed of 4 photosensors A to D. The output signals from the photodetectors 21F and 21B are supplied to a tracking/focusing error signal generating circuit 23. This error signal generating circuit 23 is arranged as shown in FIG. 5.

Figure 5:
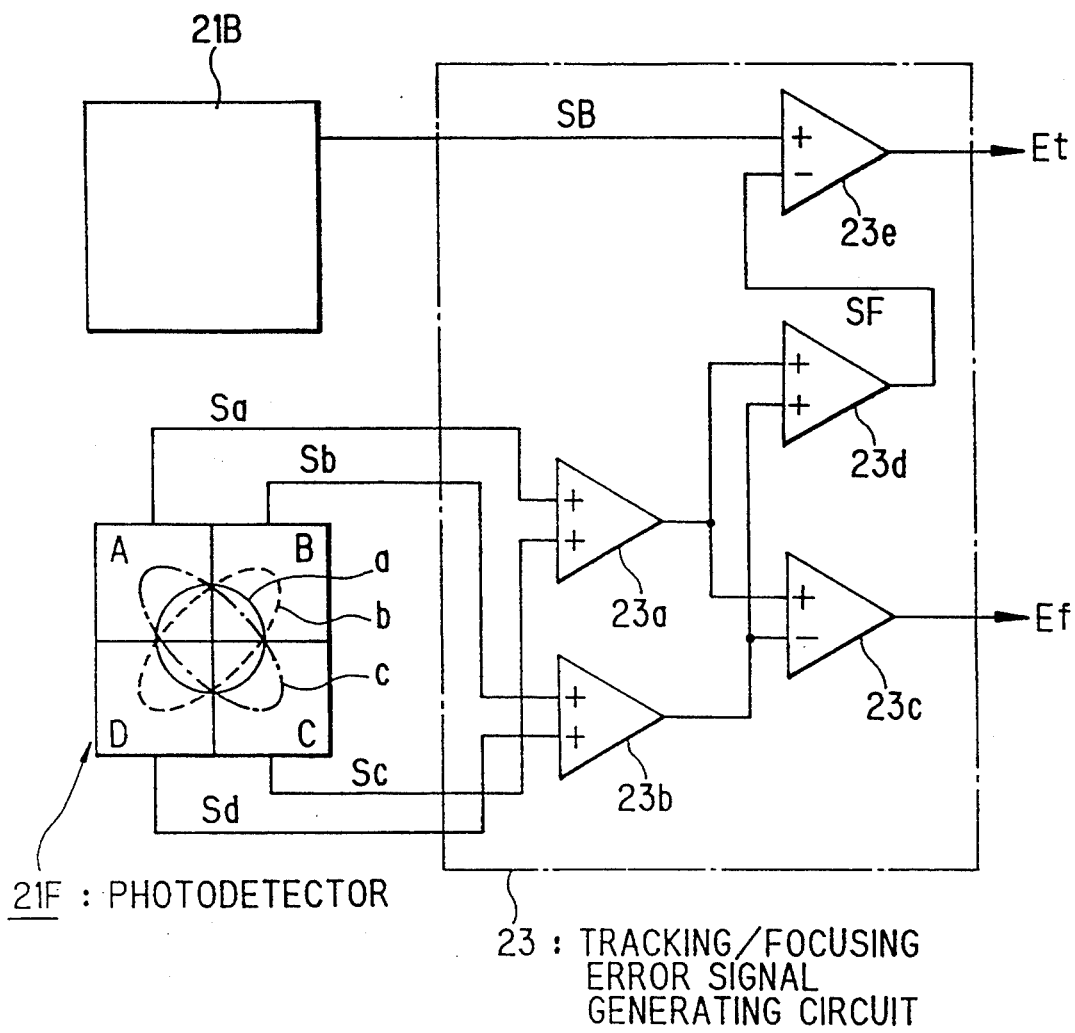
FIG. 5 is a circuit diagram of an error signal generating circuit employed in the optical disk reproducing apparatus shown in FIG. 3.

In FIG. 5, output signals Sa and Sc from photosensors A and C of the photodetector 21F are added to each other in an adder 23a. Likewise, output signals from photosensors B and D are added by an adder 23b. Then, output signals from the adders 23a and 23b are subtracted from each other at a subtracter 23c, so that a focusing error signal Ef is produced.

Also, the output signals from the adders 23a and 23b are added in an adder 23d. Then, an output signal SF from the adder 23d is subtracted from an output signal SB from the photodetector 21B in a subtracter 23e to produce a tracking error signal Et.

Figure 6:
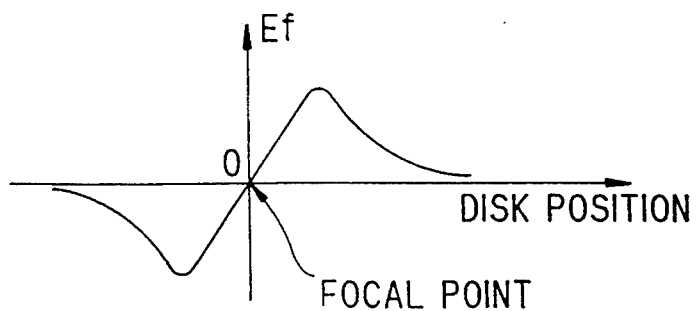
FIG. 6 represents variations in a focusing error signal.

Here, a shape of a light spot on the photodetector 21F is represented as a solid line "a" when the disk position is located at the focal point of the objective lens 17, is represented as dotted line "b" when the disk position is located far from the objective lens 17, and indicated by a dot and dash line when the disk position is located very close to the objective lens 17. Therefore, the focusing error signal Ef is varied in accordance with the disk position as shown in FIG. 6. Although not shown in FIG. 5, an optical spot formed on the photodetector 21B has a shape similar to that of the optical spot formed on the photodetector 21F.

Figure 1:
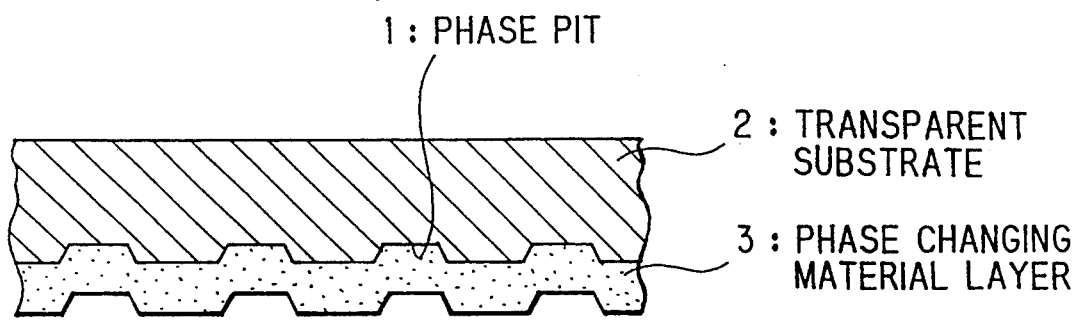
FIG. 1 is a sectional view of a structure of an optical disk.
Figure 7:
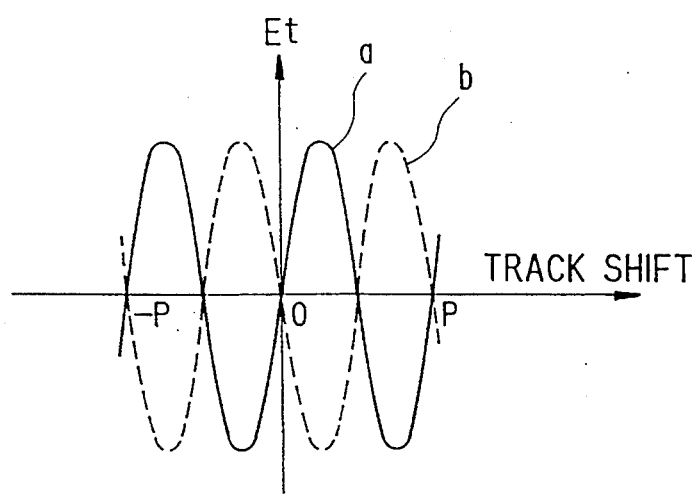
FIG. 7 represents variations in a tracking error signal with respect to a track shift.

When there is no track shift, the output signal SF of the adder 23d is equal to the output signal SB of the photodetector 21B, so that the tracking error signal Et becomes 0. When there is a slight track shift at a (−T1) side of the track, the output signal SF is greater than the output signal SB, whereby the tracking error signal Et becomes negative. Conversely, when there is a slight track shift at a (+T1) side of the track, the output signal SF is smaller than the output signal SB, so that the tracking error signal Et becomes positive. A solid curve "a" of FIG. 7 represents variations in the tracking error signal Et with respect to the track shift.

Returning to FIG. 3, the focusing error signal Ef derived from the tracking/focusing error signal generating circuit 23 is supplied to a focusing servo circuit 24. This focusing servo circuit 24 controls a current flowing through a focus coil 25 in such a manner that the disk position is located at the focus point (Ef=0) of the objective lens 17 (i.e., a focusing servo control by the astigmatism correcting method).

Also, the tracking error signal Et from this signal generating circuit 23 is furnished to a tracking servo circuit 26. This tracking servo circuit 26 controls a current flowing through a tracking coil 27 in such a way that a tracking shift becomes 0 (Et=0), namely a tracking servo control by the three-beam method.

As previously described, in accordance with this preferred embodiment, the optical spots by the reflection light of the side spots ±SP1 are formed on the photodetectors 21F and 21B. Then, the tracking error signal Et is formed by the output signals SF and SB of these photodetectors 21F and 21B, and the tracking servo control is carried out by the three-beam method.

It is so designed that the reflectivity within the side spots ±SP1 not be changed by the variations in the temperature distributions by limiting the light intensity of the side spots ±SP1, and by making sure that the side spots ±SP1 are formed on the positions located sufficiently apart from the track T0 along the tracking direction so that no adverse influence (variations in reflectivity) caused by the thermal history of the main spot SPO is present. Thus the tracking error signal Et can be obtained in a stable condition, and further a stable tracking control can be done.

Further, the focusing error signal Ef is produced by the output signals Sa to Sd of the photodetector 21F corresponding to the 4-splitted photosensors, and the focusing servo control is carried out by the astigmatism correcting method. As previously stated, since it is so set that the reflectivity within the side spots ±SP1 remains uniform, the focusing error signal Ef can be obtained under a stable condition and the stable focusing control can be done.

It should be noted that although the side spots ±SP1 are formed at the position located apart from the track T0 by ±5P/4 along the tracking direction in the above-described preferred embodiment, such side spots may be formed on positions separated from the track T0 by ±(¼±N/2) P (N=0, 1, 2, ... ), generally speaking. When the side spots are formed at the positions separated from the track T0 by ±P/4, a distance between the main spot SPO and the side spots ±SP1 must be sufficiently separated from each other along the scanning direction SC in order not receive any adverse influence caused by the thermal history of the main spot SPO. Such a separation may be achieved by controlling the pitches of the diffraction grating 14, and also by controlling the rotation of the diffraction grating with respect to the optical axis of the semiconductor laser.

When track direction separation distances are given by the formula $\pm(\frac{1}{4}\pm N/2)$ P (N=0, 2, 4, . . . ), the tracking error signal Et varies as shown by a solid curve "a" of FIG. 7. When track direction separation distances are given by the formula $\pm(\frac{1}{4}\pm N/2)$ P (N=1, 3, 5, . . . ), the tracking error signal Et is varied as indicated by a dotted curve "b" of FIG. 7.

As previously described in detail, according to the present invention, the light intensity of the second and third optical spots (side spots) is lower than that of the first optical spot (main spot), and the positions of the second and third optical spots are located at such positions that there is no adverse influence caused by the thermal history of the first optical spot. Also, there is no change in the reflectivity caused by the variations in the temperature distribution within the second and third optical spots. As a consequence, when the tracking servo control is performed by the three-beam method based on the reflection light from the second and third optical spots, the tracking error signal can be obtained under the stable condition, and the stable tracking control can be achieved.

What is claimed is:

1. An optical disk reproducing apparatus for reproducing an optical disk having a material layer whose reflectivity changes when its temperature exceeds a predetermined value, is fabricated on a transparent substrate in which a phase pit has been formed in response to an information signal, said optical disk reproducing apparatus comprising:
   an optical pickup for reading said information signal by irradiating on a recording plane of said optical disk, a first optical spot for reproducing the information signal by causing the temperature of the disk to exceed the predetermined value, and also second and third optical spots each having a light intensity lower than a light intensity of said first optical spot such that the temperature of the second and third optical spots do not cause the temperature of the optical disk to exceed the predetermined value, with the second and third optical spots located at positions where there is no adverse influence caused by a thermal history of said first optical spot;
   tracking control means for performing a tracking control of said optical pickup based upon a difference signal between detection signals derived from first photo detecting means and second photo detecting means of said optical pickup, for receiving light of said second and third optical spots reflected from said optical disk; and
   wherein said spot positions of said second and third optical spots are set to positions located apart from a position of said first optical spot along a tracking direction by $\pm(\frac{1}{4}\pm N/2)$ P (where symbol "P" denotes a track pitch and symbol "N" indicates a natural number).

2. An optical disk reproducing apparatus a claimed in claim 1, wherein said optical pickup includes:
   a laser light source;
   an optical separating element for separating a laser beam projected from said laser beam to obtain at least three light beams used to produce said first, second and third optical spots on the optical disk; and
   an objective lens for focusing each of the light beams separated by said optical separating element onto the recording plane on the optical disk.

3. An optical disk reproducing apparatus as claimed in claim 1, wherein one of said first photo detecting means and second photo detecting means includes four light receiving units, and said optical disk reproducing apparatus further comprises focusing control means for producing a focusing control signal based upon output signals derived from said four light receiving units, and for performing a focusing control of said optical pickup based on the produced focusing control signal.

4. An optical disk reproducing apparatus for reproducing an optical disk having a material layer whose reflectivity is lowered when its temperature becomes higher than a predetermined value, and which is fabricated on a transparent substrate in which a series of phase pits have been formed along parallel information tracks on a recording plane in response to an information signal, comprising:
   an optical pickup for reading said information signal by irradiating on the recording plane of said optical disk a first optical spot for reproducing the information signal from a first information track causing the temperature of the disk to exceed the predetermined value and also a second optical spot and a third optical spot, each of the second optical spot and the third optical spot having a light intensity lower than a light intensity of said first optical spot such that the temperature of the second and third optical spots do not cause the temperature of the optical disk to exceed the predetermined value, with the second and third optical spots being located not on the first information track and at least partially over information tracks other than the first information track; and
   tracking control means for performing a tracking control of said optical pickup based upon a difference signal between detection signals derived from first photodetecting means and second photo detecting means of said optical pickup, for receiving light of said second and third optical spots reflected from said optical disk.

5. An optical disk reproducing apparatus as claimed in claim 4, wherein said spot positions of said second optical spot and third optical spot are set to positions located apart from a position of said first optical spot by $\pm(\frac{1}{4}\pm N/2)$ P (where symbol "P" denotes a track pitch and symbol "N" indicates a natural number) along a tracking direction.

6. An optical disk reproducing apparatus for reproducing an optical disk manufactured so that a material layer whose reflectivity changes when a temperature exceeds a predetermined value, is fabricated on a transparent substrate in which a phase pit has been formed in response to an information signal, said optical disk reproducing apparatus comprising:
   an optical pickup for reading said information signal by irradiating on a recording plane of said optical disk a first optical spot for reproducing the information signal, and also second and third optical spots each having a light intensity lower than a light intensity of said first optical spot and located at positions where there is no adverse influence caused by a thermal history of said first optical spot; and
   tracking control means for performing a tracking control of said optical pickup based upon a difference signal between detection signals derived from first photo detecting means and second photo detecting means of said optical pickup, for receiving light of said second and third optical spots reflected from said optical disk;

wherein said spot positions of said second and third optical spots are set to positions located apart from a position of said first optical spot along a tracking direction by $\pm(\frac{1}{4}\pm N/2) P$ (where symbol "P" denotes a track pitch and symbol "N" indicates a natural number);

wherein said first optical spot has a light intensity such that reflectivity of said optical disk is changed in portions of said first optical spot and;

wherein said second and third optical spot have a light intensity such that reflectivity of said optical disk does not change in said second and third optical spots.

7. An optical disk reproducing apparatus for reproducing an optical disk having a material layer whose reflectivity is lowered when a temperature becomes higher than a predetermined value, and which is fabricated on a transparent substrate in which a series of phase pits have been formed along parallel information tracks on a recording plane in response to an information signal, comprising:

an optical pickup for reading said information signal by irradiating on the recording plane of said optical disk a first optical spot for reproducing the information signal from a first information track and also a second optical spot and a third optical spot, each of the second optical spot and the third optical spot having a light intensity lower than a light intensity of said first optical spot and being located not on the first information track and at least partially over information tracks other than the first information track; and tracking control means for performing a tracking control of said optical pickup based upon a difference signal between detection signals derived from first photodetecting means and second photo detecting means of said optical pickup, for receiving light of said second and third optical spots reflected from said optical disk;

wherein said first optical spot has a light intensity such that reflectivity of said optical disk is changed in portions of said first optical spot, wherein said second and third optical spot have a light intensity such that reflectivity of said optical disk does not change in said second and third optical spots.

8. The optical disk reproducing apparatus as claimed in claim 7, wherein spot positions of said second optical spot and third optical spot are set to positions located apart from a position of said first optical spot by $\pm(\frac{1}{4}\pm N/2) P$ (where symbol "P" denotes a track pitch and symbol "N" indicates a natural number) along a tracking direction.

* * * * *